United States Patent [19]
Arter et al.

[11] 3,931,639
[45] Jan. 6, 1976

[54] TRANSVERSE TRACK LOCATION DEVICE WITH CALIBRATED STEPPER MOTOR

[75] Inventors: Nelson Kay Arter, Longmont; George William Brock, Boulder; Howard Carl Jackson, Longmont; James Warren Leggate, Boulder, all of Colo.

[73] Assignee: International Business Machines Corporation, Armonk, N.Y.

[22] Filed: July 12, 1974

[21] Appl. No.: 487,946

[52] U.S. Cl. .................... 360/70; 360/73; 318/685
[51] Int. Cl.² .................. G11B 21/04; G11B 15/46
[58] Field of Search ........... 360/77, 76, 73, 70, 75; 318/318, 314, 685, 696

[56] References Cited
UNITED STATES PATENTS

| | | |
|---|---|---|
| 3,358,080 | 12/1967 | MacLeod .................... 360/70 |
| 3,644,813 | 2/1972 | Schoendorff ................ 318/318 |
| 3,805,286 | 4/1974 | Kavanagh ................... 360/73 |
| 3,845,500 | 10/1974 | Hart ........................... 360/77 |

*Primary Examiner*—Bernard Konick
*Assistant Examiner*—Alan Faber
*Attorney, Agent, or Firm*—Herbert F. Somermeyer

[57] ABSTRACT

A track or stripe tape positioner for a helical scan or rotary head recorder uses digital techniques. The expected step size is preset into a counter. During the next phase, a calibration phase, the tape is stepped through a plurality of stripes whereat the preset value is adjusted to measured values. In the third phase, the average step size is maintained subject to certain averaged changes thus providing a high degree of noise rejection to ensure reliable incremental stepping of a record tape through the recorder.

8 Claims, 6 Drawing Figures

TRANSVERSE TRACK LOCATION DEVICE WITH CALIBRATED STEPPER MOTOR

DOCUMENTS INCORPORATED BY REFERENCE

The present invention is usable in connection with the practice of the invention set forth in copending commonly assigned patent application, Ser. No. 451,270 filed Mar. 14, 1974 by N. K. Arter, et. al, Magnetic Record Member for Use with Rotating Head Magnetic Recording Apparatus.

An article with which the present invention is advantageously practiced is set forth in commonly assigned co-pending application, Ser. No. 391,405 filed Aug. 24, 1973, now U.S. Pat. No. 3,864,739, by H. C. Jackson, "Tape Motion Control in an Incrementing Magnetic Tape Transport".

The servo track positioning apparatus with which the present invention can be used is set forth in co-pending commonly assigned patent application, Ser. No. 415,080 filed Nov. 12, 1973, by G. A. Hart, "Head to Track Alignment in a Rotating Head Magnetic Tape Unit, now U.S. Pat. No. 3,845,500.

Data recording device (DRD) with which the present invention may be advantageously employed is shown in commonly assigned co-pending patent applications, Ser. No. 335,609 filed Feb. 26, 1973, by M. L. Nettles, "Continuous Compliant Guide for Moving Web", now U.S. Pat. No. 3,850,358 and Ser. No. 375,966 filed July 2, 1973, by P. J. Arsenault and E. P. Kollar, "Improved Tape Transport for Magnetic Recording with a Rotating Head"now abandoned. Such a data recording device is advantageously employed in a mass storage system (MSS) as shown and described in co-pending commonly assigned application, Ser. No. 198,877 filed Nov. 15, 1971 and now U.S. Pat. No. 3,825,208.

BACKGROUND OF THE INVENTION

The present invention relates to positioning tape with respect to a rotating head of helical scan or rotating head digital signal recorder. In particular, it provides for precise calibration and a high degree of noise rejection in a tape positioning apparatus.

In rotating head type magnetic tape recorders, a cylindrical mandrel or drum includes a rotating head adapted for transducing engagement with a tape helically wound on such mandrels. Included in many such recorders are automatic tape threading, precise guiding, high-speed searching and step-by-step motion as set forth in the documents incorporated by reference.

In those recorders, stepping from one helical track or stripe to another, having digital data recorded in the stripe, requires a precise stable stepping control. Such is particularly true when the tape is to be recorded on one digital signal recorder and later read by another digital signal recorder.

In such recorders, a data cartridge can be automatically loaded into the data recording device (DRD) which includes a rotating head digital signal recorder. The tape is automatically threaded and would onto a take-up spool or capstan in a known manner. In some of such recorders, a tachometer on the take-up spool or capstan driving motor is used to control the tape motion across the mandrel and past the rotating head. When the tape is first wound on the take-up capstan, an incremental angular motion corresponds to a first shortest step of the tape past the rotating head. As tape is wound onto the capstan and the radius of the outside wrap increases, the same angular step results in an increasing length of tape being transported past the head. Accordingly, if the take-up capstan tachometer is to be used for positioning control, as is desired (without limitation) in connection with practicing the present invention, the angular step must be translated into an appropriate length of tape for insuring uniform stripe-to-stripe distances. Additionally, when stripes are recorded on one recorder and read on another, certain perturbations in the recording can cause varying spacing between successive ones of said stripes. Such variations can be extremely small. Yet, cummulative errors resulting from stepping past a plurality of such stripes in recording or reading data can result in recording errors. Accordingly, it is desired to provide a data recording device which accommodates perturbations in stripe-to-stripe spacing as well. The changes in linear transition of the tape as a tape wrap on a take-up capstan changes.

Most helical scan recorders operate with record tapes that have longitudinally extending transversely sensed servo tracks. Such servo tracks are used in connection with precisely locating the tape with respect to the rotating head for transducing operations. As the rotating head begins its scan of the tape, it crosses over one edge of the tape. Such crossing can induce perturbations in the tape resulting in less than desirable transducing relationships between the head and the record tape. Such perturbations in the tape may result in erroneously interpreted servo data from such tracks. However, as the head completes its scan of the tape and crosses the opposite edge, thereof, fewer perturbations are introduced into the tape. However, because of contamination on the tape or void spots in the magnetic coding, servo errors of a permanent or transitory type can be introduced into the mechanism to position the tape such that the head path is not precisely centered on a given record stripe or track. It is highly desirable in a digital signal recorder where all signals must be successfully recorded and recovered as opposed to video recorders wherein one stripe can be ignored without disastrous effects that the controlling servo mechanism be immuned to noise and jitter for insuring reliable and precise stepping control of the tape past the transducing station.

SUMMARY OF THE INVENTION

Accordance with the invention transducing operations of a rotating head signal recorded within a data recording device (DRD) includes a preset step followed by a calibrate step which adjusts preset value to the actual average spacing between record stripes and followed by an operate phase having high noise rejection properties.

In accordance with one aspect of the invention, the area to be transduced was always approached from the same direction. After an initial search for the record area on the tape which stops a predetermined number of stripes to one longitudinal side of the transducing area, the tape is stepped through a calibrate phase for adjusting preset step size to that actually measured on the tape. In a preferred form the calibrate phase is divided into two sub-phases. A first sub-phase adjusting the step size by unity for each stripe followed by a second sub-phase wherein the present size as adjusted during the first sub-phase is further adjusted every other stripe. Calibration phase is followed by an operate phase wherein the step size average is adjusted by unity only if the offset error on the predetermined number of successive stripes has the same sync; i.e., the offset is always in the same direction. In addition, to accommodate perturbations, the distance between adjacent stripes, a momentary override of the average on a stripe-by-stripe basis prevents cummulative errors from occurring.

The foregoing and other objects, features, and advantages of the invention will become apparent from the following more particular description of the preferred embodiment of the invention, as illustrated in the accompanying drawing.

THE DRAWING

DETAILED DESCRIPTION

Figure 1:
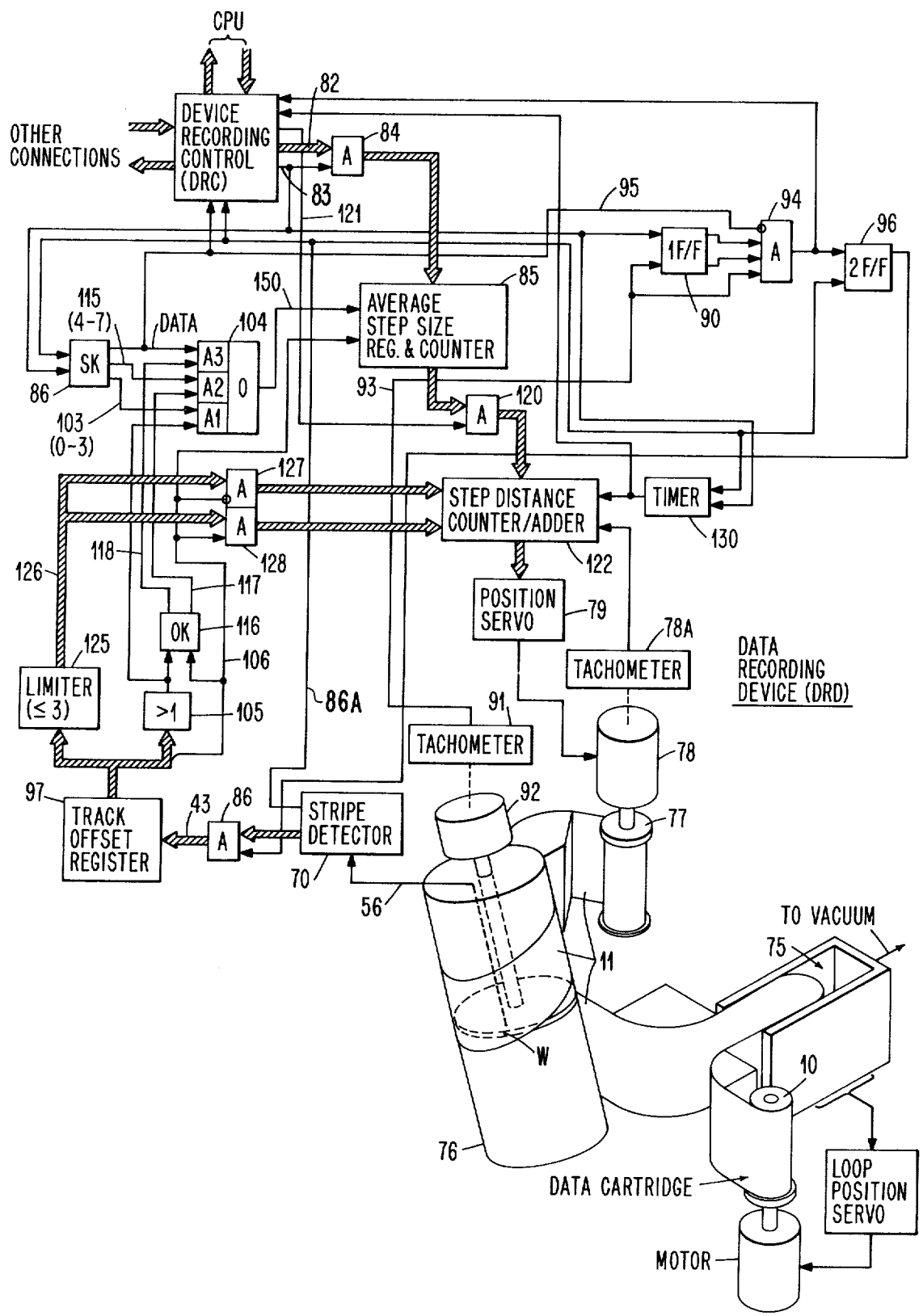
FIG. 1 is a combined diagrammatic and logic diagram of a data recording device and its associated device recording control (DRC) which employs the present invention, that portion of the circuitry directed toward the invention is set out in detail.
Figure 2:
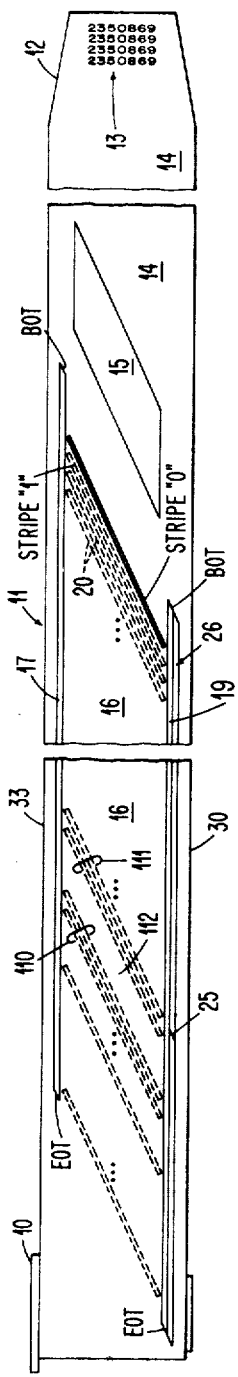
FIG. 2 is a diagrammatic showing of a tape usable with the FIG. 1 illustrated DRD.

Referring now more particularly to the drawing, like numerals indicate like parts and structural features in the various views and diagrams. The FIG. 1 illustrated data recording device (DRD) is advantageously employed as a part of a mass storage facility (MSF) such as that shown in Beach et al supra. A data cartridge as shown in that patent application includes a spool 10 loadable onto the DRD wherein it forms the payout spool of the signal recorder. The free ended tape 11 is unwound from spool 10 through a vacuum column on buffer bin 75 around a mandrel 76 which include the rotating head W. Thence the tape is guided onto a take-up capstan 77 driven by motor 78 under control of a position servo 79. In a preferred form of DRD, tape 11 is stepped incrementally past head W for transducing operations with the FIG. 2 illustrated tape. Transducing operations conducted via transducer W as well as a second transducer R (not shown in FIG. 1) conducted through a device recording control (DRC) constructed using known techniques for digital signal recorders and connected to a central processing unit, computer or data channel as is well known in the art. Data flow connections between DRC and DRD are omitted for brevity. Before proceeding with a detailed discussion of the invention, the environment in which the invention operates is first described for clearly pointing up the advantages accrued to such an environment by practicing the present invention.

The tape 11 is first described. Referring to FIG. 2 single flange spool 10 mounts magnetic tape member 11. A cylindrical sleeve (not shown) fits on the spool to complete a dust-proof data cartridge. The free end of member 11 is tapered aat 12 for facilitating automatic threading. In the free-end portion, as at 13, a plurality of imprinted article serial numbers reside on the coated side of the article. The imprinted serial numbers are viewable through a covering transparent cylindrical sleeve (not shown). Such printing enables visual inspection and identification of various improved articles for facilitating handling and transfer. Such serial numbers facilitate logging performance statistics about each of the articles, as well as facilitating identification.

Immediately adjacent free end 12 is a leader area 14 which may or may not have magnetic coating thereon. Leader 14 facilitates automatic threading operations. Immediately adjacent area 14 is a magnetically coated test area 15 for enabling recording and readback of signals by each digital signal recorder employing the improved article. A test pattern of signals recorded in area 15 is sensed by the digital signal recorder. The amplitude, phase shift, and other characteristics of the readback signal are analyzed by recorder circuits which then automatically adjust the readback circuits for optimum readback of data signals recorded on the improved article. The details of such automatic readback circuits are not part of the present invention.

The data recording area 16 is completely defined and located by a pair of servo track areas 17 and 19. Each servo track area includes areas for two parallel longitudinally extending servo tracks 17A, 17B, 19A, 19B. The servo tracks contain signals identifying data stripe on track locations indicated by dashed lines 20 in FIG. 2 and by long narrow rectangles 21 and 22 in FIG. 3.

The servo track areas 17 and 19 have precise longitudinal extents and locations. These areas demark all recording areas on the tape. The servo area ends adjacent free end 12 define beginning of tape, labeled "BOT", which signifies the area in which a rotating head can start recording data signals. In a similar manner, the spool ends of servo track areas 17 and 19 precisely denote end of the tape, labeled "EOT", which correspondingly defines the other longitudinal limit in which a recorder may record data signals.

In addition to data signal receiving area 16, which is left blank when the improved article is first manufactured, an identification and addressing track is located at 25 with a longitudinal extent substantially longitudinally coextensive with servo area 19. The identification area ends at 26. The first data record area number was 0 identifying a so-called "stripe 0".

Figure 3:
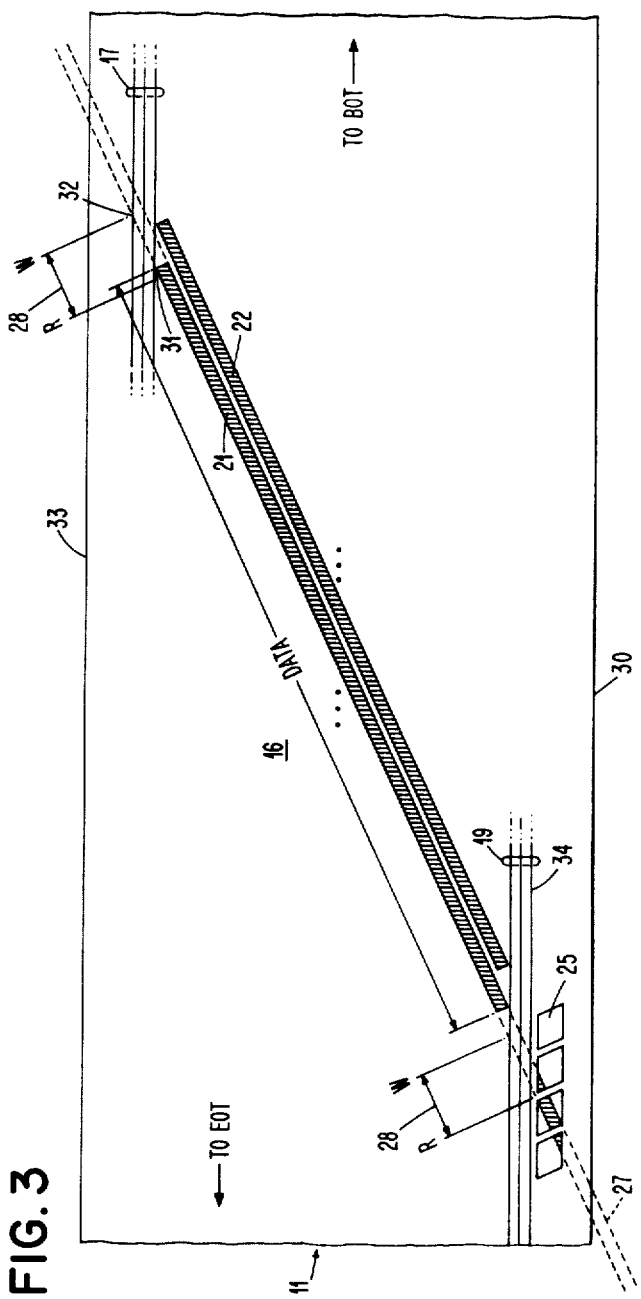
FIG. 3 is an enlarged diagrammatic showing of certain aspects of the FIG. 2 illustrated tape.

Referring now more particularly to FIG. 3, the relationship of the record article to a particular digital signal recorder of the incremental step type with which the record article can be advantageously employed is described. The timing relationship of a rotating head scanning tape stopped between incremental steps with respect to the servo track areas and the identification and address stripe show the advantageous usage. As mentioned above, the angle of the data stripes, such as stripes 21 and 22, with respect to the longitudinal edges of the tape, is about 17-½°. The data receiving areas or stripes 21 and 22 extend at such an angle between the precisely aligned servo areas 17 and 19. The lateral extent of the servo areas 17 and 19, as measured along the scan path 27 of a rotating head, is slightly less than the intergap distance between a write (W) and a read (R) gap of the single two-gap head on the rotor. This intergap distance, as at 28, being slightly greater than such transverse dimension of the servo areas, is advantageously employed when recording and stepping the improved article by a digital signal recorder. Assume that when gap W is scanning the tape at the lower edge 30, it is connected to a read-back circuit. Gap W scans the address portion 25. The readback signals being identified as data signals are ignored. As gap W scans servo area 19, the read-back signals are identified as the servo signals and sent to a servomechanism used in connection with transporting article 11 past the rotating heads having gaps W and R. As gap W scans servo area 19, at 17-½°, trailing gap R follows by distance 28 to simultaneously scan address area 25. The servo signals from gap W drive the servomechanism simultaneous with other readback circuits, analyzing the signals from area 25 to identify the location of the improved article with respect to gap W. After gap R has completed a scan of the appropriate portion of address area 25 signals, electronic circuits determine whether or not the article is appropriately positioned. If it is, then recording currents are turned on for recording data signals in stripe area 21, precisely aligned along the 17-½° scan path with the appropriate portion of servo tracks in area 19, as well as the later-described address portion of area 25 associated with data signal receiving area 21.

The present invention provides a high degree of accuracy and stability in such stripe locations. As gaps W and R continue to scan across tape 11, the signals are recorded through gap W into data signal receiving area 21. For checking the correctness of the recording in area 21, the recorded signals are simultaneously sensed by gap R as it scans area 21. Such read-after-write recording verification can follow the same procedures used in connection with prior digital data signal recorders, such as employed for ½ inch tapes.

As gap W leaves area 21, as at 31, all recording currents are removed from the gap. Gap R continues to sense the recorded signals. Gap W senses the area 17 servo signals to supply servo track signals to said servomechanism for use in connection with positioning tape 11 in accordance with the present invention. Since the intergap distance 28 is slightly longer than the 17-½° transverse dimension of area 17, gap W leaves area 17, as at 32, about substantially coincidentally with gap R leaving area 21, as at 31. At this time, gap R is substantially transversely inward of upper edge 33 of tape 11. The servomechanism is now actuated to step the article 11 to the next stripe, such as stripe 22. The constants of acceleration and the rotor velocity can be matched such that the stepping to stripe or signals receiving area 22 is the same time it takes for gap W to move from area 17 to just immediately prior to area 19 which is aligned with stripe 22. This transit time corresponds to the transverse dimension from area 17 to edge 33, plus the distance from edge 30 to lower edge 34 of area 19. This statement assumes a helical wrap of 360° of article 11 around a later-mentioned mandrel, such that edges 30 and 33 abut. In this manner, for a single head type rotor, a minimum time is lost because of the rotor movement and tape movement for maximizing data signal throughputs.

Figure 4:
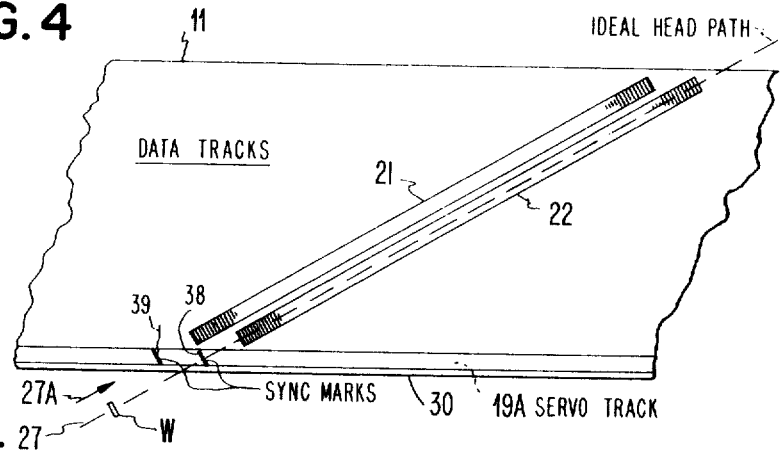
FIG. 4 is a simplified diagrammatic showing of a tape illustrating an advantageous servo signal arrangement usable with the present invention.

FIG. 4 diagrammatically shows data track and servo track format. In this arrangement, head W moves in the direction of arrow 27A along the ideal head path 27. This head path is termed "ideal" in that it coincides with the center of transverse data track or stripe 22.

The lower edge 30 of tape 11, that is the tape's edge first or leading edge encountered by head W, includes servo track 19A having distinctive data patterns in the form of sync marks 38 and 39. Sync mark 38 identifies the physical location of data stripe or track 22 whereas sync mark 39 identifies the physical location of adjacent stripe 21.

Figure 5:
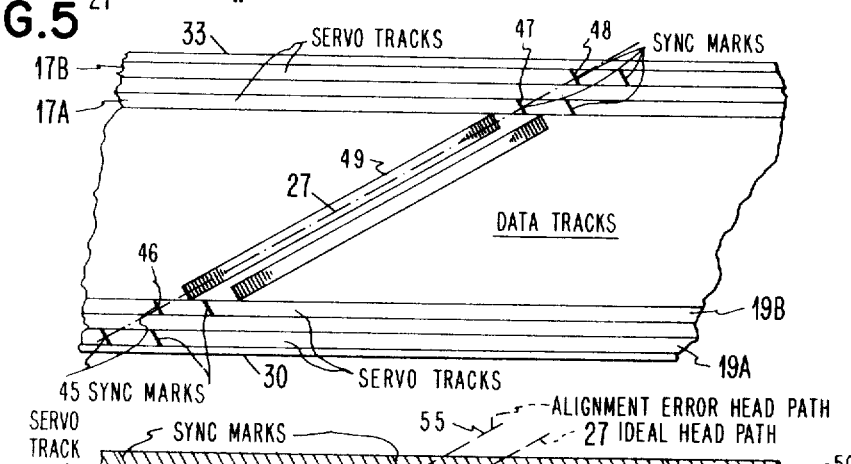
FIG. 5 is a diagrammatic showing of the portion of the tape of FIG. 2 with the preferred highly reliable servo track arrangement.

FIG. 5 shows the preferred form of a servo format including redundant sensing of head-to-track alignment and wherein the skew relationship between the head's path 27 and a data stripe can be measured. Each servo area includes two servo tracks 19A and 19B located near bottom tape edge 30 and two servo tracks 17A and 17B of servo area 17 located near upper tape edge 33. All servo tracks are identical, with the exception that they are longitudinally offset, one from the other. Four sync marks 45–48 provide redundant sensing of the relative position of the head path 27 and the extent of stripe 49, for example. Likewise, the position of head W as it begins its scan as at sync marks 45 and 46, can be compared to the position of the head as it completes its scan at sync marks 47 and 48, to provide a measure of the skew of the head track relative to the data stripe 49.

Figure 6:
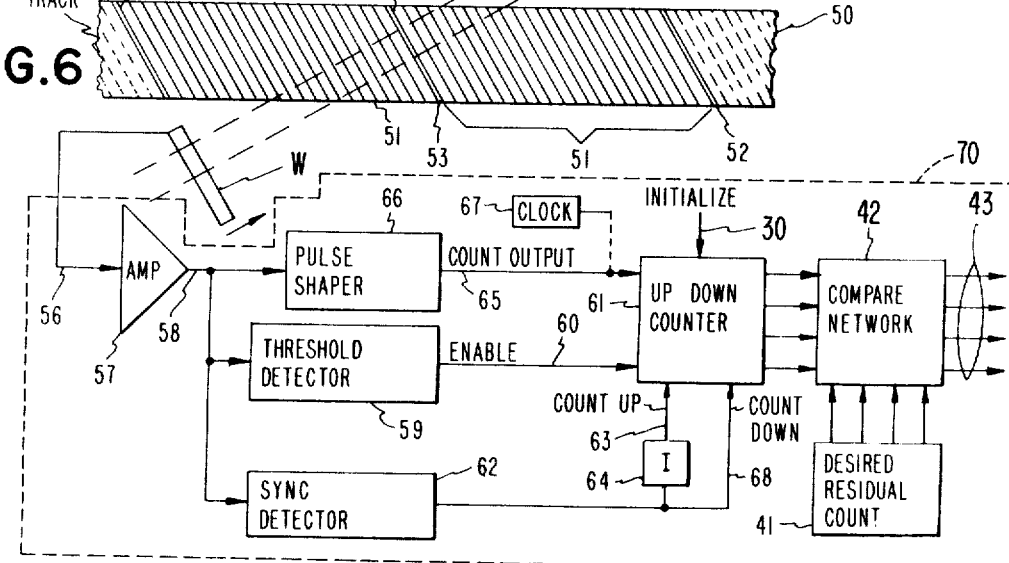
FIG. 6 is a diagrammatic showing of the portion of servo track 17A of FIG. 5, together with servo signal detector usable to provide offset or error information to apparatus employing the present invention as detailed in FIG. 1.

FIG. 6 is an enlarged diagrammatic view of the servo signal format in each and every servo track together with details of a head/stripe alignment detecting network. In this figure the servo track portion is identified by reference numeral 50. The servo track portion is made up of two distinctively different data patterns. Repeating servo signal pattern 51 is a constant frequency data pattern. Each servo signal pattern 51 begins and ends with a second distinctive servo signal pattern, namely, mark patterns 52 and 53.

The center of head W, when following ideal head path 27, prosses the center of sync mark 53. If head W is misaligned with the transverse data track or stripe located by sync mark 53, then offset head path 55 is transversed. To realign a stripe with the head path, tape 11 is moved a small step to the left to bring the center of the head's path into coincidence with the center of sync mark 53. The servo track sync marks, two of which are identified as 52 and 53, may be double frequency data patterns, or they may alternatively, be any other type of data pattern, or absence of data, which is distinctively different than the constant frequency data pattern 51. By way of a specific example, the physical head dimensions, in a particular embodiment of the present invention, where such that the head gap width, measured normal to its direction of travel, was 0.015 inch. The length of sync marks 52 and 53 as well as the constant frequency data pattern, again measured normal to the direction of head travel, is preferably also equal to 0.015 inch. The spacing between the individual magnetic transitions making up constant frequency pattern 51, measured in the direction of head travel, was 0.0006 inch.

In detecting stripe alignment, the FIG. 5 illustrated apparatus counts constant frequency transitions 51 in counter 61 until sync mark 53 is detected by detector 62. Then the constant frequency transition 51 to the right of sync mark 53 decrements counter 61. If the final contents of counter 61 is zero, head path 27 is being followed. Any non-zero remainder indicates stripe or track offset. The offset indication from zero track 19A is preferably used in connection with the present invention as later described with respect to FIG. 1.

Referring now to the head/track alignment stripe detector 70 of FIG. 5, the signal output of head W, as it sweeps across servo track portion 50, appears on conductor 56. This head output signal is applied to the input of amplifier 57 and appears at amplifier output signal on conductor 58. When this signal amplitude reaches a given minimum threshold magnitude, threshold detector 59 supplies or enables signal over conductor 60 to enable operation of up/down (increment-/decrement) counter 61. Since head W has just begun scanning the lower leading edge of servo track portion 50, a sync mark has not yet been detected at this time and sync detector 62 has not yet supplied an activating output signal. Thus, conductor 63 is enabled by way of inverter 64 enabling counter 31 to count up.

As head W continues its sweep across servo track 50, counter 61 is incremented by signal output on line 65 of pulse shaper 66. Pulse shaper 66 is effective to shape the constant frequency signal which is being provided from the servo track's constant frequency portion 51.

In an alternative embodiment the count input to counter 61 may be provided by a constant frequency clock 67.

When head W encounters sync mark 53, sync (threshold) detector 62 supplies an active output signal over line 688 enabling counter 61 to count down. The count magnitude contained within counter 61 at this instant is dependent upon the relative alignment between head W and the data track identified by sync mark 53. For example, when head W follows ideal head path 27, the count within counter 61 will be smaller than had it been following offset path 55. In any event, as head W continues to sweep servo track portion 50, constant frequency portion 51 on the right side of sync mark 52 decrements counter 61. As head W leaves servo track portion 50, the minimum signal threshold is detected by detector 59 and counter 61 is inhibited from further counting.

A residual count now resides within counter 61. The magnitude and sense (sign) of this count are a measure of the magnitude and direction of offset between the head path and the stripe associated with sync mark 53. For example, if the initialized state of counter 61 is zero, the counter's trapped or residual count will be zero when the head follows ideal head path 27. A positive residual count indicates that the alignment error was such as shown by offset track path 55. A negative residual count indicates that head W traversed an offset path displaced on the other side of ideal head path 27 from offset path 55.

This residual count is presented to compare network 42 where it is provided as an input to position servo 22 (FIG. 1) to produce whatever fine tape positioning is necessary in order to achieve accurate head-to-track alignment for proper transducing of the data track magnetic states by head W. The preferred arrangement over using networks 41 and 42 is to preset counter 61 to a count which will result in a known residual count when alignment is proper, and will result in a residual count which may be used directly as an output to stripe detector 70.

When sync marks 52 and 53 are ideally centrally aligned with their respective data tracks, a known misalignment of such sync marks yields a non-zero residual count at ideal head path 27. In this event, a comparison is made between the actual residual count and the desired residual count to detect the head/track alignment error.

While the above described step-by-step control operates satisfactory in many environments, enhanced operations particularly noise rejection as well as adaptability to varying spool wrap is provided by practicing the present invention. The data recording control can calculate a present value of a given number of tachometer pulses between the center line of two adjacent record stripes. A preferred form of the invention, the tachometer on motor 78, is a two-phase tachometer yielding a succession of four discrete signal states for each tachometer step. Such discrete signal states are termed tachometer pulses and are the pulses counted in connection with indicating track offset and step size in the illustrated embodiment. The device recording control employs an algorithm for calculating a number of such tachometer counts necessary to move the tape a given fixed distance between two adjacent record stripes in terms of incremental angular steps of motor 78. The equation solved by DRC in calculating the present value is:

$$K = \left\{ \frac{\sqrt{R^2 + \frac{T(L+S)}{\pi}} - \sqrt{R^2 + \frac{TL}{\pi}}}{T} \right\} C$$

where:

$K$ = number of tachometer pulses between two adjacent record stripes.

$R$ = radius of take-up spool 77 hub over which tape 10 is wrapped.

$T$ = thickness of tape 10.

$L$ = length of tape wrapped around takeup spool 77 hub.

$S$ = center-to-center spacing between two adjacent record stripes.

$C$ = number of tachometer pulses per rotation of motor 78 and take-up capstan 77.

Such value K can be precalculated for various zones on the tape and supplied over cable 82 by DRC. The selection of zones and the various values is a matter of engineering design beyond the scope of the present description. In one embodiment, the middle of the tape required 70 tachometer pulses to step from center line to center line of two adjacent record stripes. For purposes of description, the preset value 70 will be used. For a recorder having a linear tachometer, the same preset value is used throughout the tape.

DRC knows which part of the tape is to be transduced. Accordingly, upon receiving a command to transduce a series of stripes such as 110 or 111, the tape is rapidly moved to 8 stripes from the first stripe to be transduced, the first stripe to be transduced is always toward the free end 12 of tape 11; hence the tape will always be moved in the same direction for transducing operations for insuring uniformity of motion control. Upon receiving a transducing command, the tape is rapidly moved to 8 stripes from the first stripe to be transduced. At this time, DRC automatically goes into the calibrate phase and issues a preset and initiate calibrate command signal over line 83. This search command signal gates the preset value cable 82 to AND circuits 84 to average step size register encounter 85. Register 85 contains the average size of the step in terms of tachometer counts between any two adjacent record stripes depending on the tape wrap on take-up spool 77. The control signal on line 83 also resets step counter SK86 to a reference state. SK86 determines the two sub-phases of the calibration phase which respectively are the stepping of tape 11 over stripes 0 to 3 and the second sub-phase over stripes 4 to 7 of the 8 stripes immediately to the free end side of the first stripe to be transduced. At this time, DRD is ready to calibrate the FIG. 1 illustrated circuits by selectively adjusting the signal content of register 85 in accordance with the settings of SK86 and measurements provided by stripe detector 70.

It is remembered that stripe detector 70 supplies only the offset from servo track 17A, after the readback from track 17A has been compared with the readback signal from track 17B for verification. Such offset is supplied to AND circuits 86 upon completion of the verifying operation in detector 70. AND circuits 86 passed such verified values early during the second rotation for each of the stripes in the calibration phase. This is determined by a set of flip-flop controls actuated as now described. The control signal in line 83 resets first control flip-flop 90 to the reset state which indicates that the first rotation of head W is occurring. Tachometer 91 on head wheel rotor driving motor 92 includes fiducial mark indicating a reference point of rotation of head W. This fiducial mark results in a control signal traveling over line 93 to trigger first control flip-flop 90 to the second state signifying completion of the first rotation. AND circuit 94 passes the fiducial mark signal on line 93 whenever the first control flip-flop 90 is in the first state and SK86 is in an not-data state indicated by a control signal later described received over line 95. AND line 94 output signal travels to DRC signifying onset of the second rotation at a given stripe as well as setting second control flip-flop 96 to the active state signifying second rotation of head W is occurring at a given stripe. Second control flip-flop 96 active signal opens AND's 86 to pass the servo signal offset indication from detector 70 over cable 43 to track offset register 97. Upon completion of the second rotation of head W, first control flip-flop 90 returns to first state and alternates between the first and second state such that the fiducial mark signal on line 93 is alternately passed to second control flip-flop 96 during the calibration phase. A step complete signal from detector 70 resets second control flip-flop 96 upon the completion of each step thereby disabling AND's 86 until the next occurring second rotation on the immediately step 2 stripe.

Having described the gating of servo offset signals, the calibration phase will be now described. SK86 counts each step-completed signal sent by stripe detector 70. Counts 0 through 3, corresponding to the first 4 stripes, is defined as sub-phase one. SK86 supplies a first sub-phase indicating signal over line 103 to enable the AND A1 input portion of A0104 to pass a greater-than-one signal each time track offset register 97 contains an offset indication of more than one tachometer pulse. Greater-than-one detection/decode circuit 105 supplies an activating signal upon decoding that a number greater than one resides in register 97. A0104 supplies the greater than one signal to alter by unity the signal content of average step size register encounter 85 for each stripe 0 to 3 of the eight calibration stripes. The direction of size change is in accordance with the sign of the error in register 97 as supplied over line 106 to register encounter 85. By arbitrary definition, an error toward the free end of the tape 11 as shown in FIG. 2 is defined as a negative error while an error toward the spool end of the tape is defined as a positive error. Accordingly, for a positive error, the step size is decreased while for a negative error the step size is increased. Note: Stepping is from the free end of tape toward the spool. Hence, for each stripe sensed the average step size is altered plus or minus one provided a servo offset error is detected.

The second sub-phase includes stripes 4 to 7; i.e., the 4 stripes immediately toward the free end of the tape 11 adjacent to the first stripe to be transduced. SK86 indicates the second sub-phase by an active signal supplied over line 115 enabling the input AND A2 portion of A0104. The second sub-phase represents hardening of the servo loop as will become apparent. Greater than one circuit 105 supplies its signal to offset counter OK116 which counts offsets in the same direction up to four offsets greater than one. Upon a sign change, Ok116 responds to the signal on line 106 to increment or decrement the count in OK116. Accordingly, Ok116 having a count of two supplies an activating signal over line 117 to the input AND A2 portion of A0104 whenever two successive greater than one offsets of like direction are detected. This results in A0104 supplying a unitary change signal to average step size register encounter 85 which alters the count in accordance with the sign as above described. Hence, the average size is altered at one-half the rate during the second sub-phase of the calibration phase as in the first sub-phase.

Upon completion of the calibration phase, it is desired that the average step size register and counter 85 be altered only upon a predetermined number of successive offsets of like sign; i.e., the tape is always stepped such that it is either to the right or left of the ideal head path 27 before any average servo step size change is authorized. In the illustrated embodiment, only if four successive servo offset errors of like sign are detected will the signal content step size indication of register 85 be altered. OK116 supplies an active signal over line 118 only when four successive offsets of like sign have occurred. Input AND portion A3 of A0104 responds to the line 118 signal and SK86 indicating data over line 150 to supply a step size altering signal to register and counter 85, the direction of alteration again being determined by the sign signal on line 106.

Average step size contained in register and counter 85 is gated through AND's 120 by step initiate signal received over line 121 from DRC. The step size being inserted into step distance counter-adder 122 by AND's 120 activates position servo 79 to actuate motor 78 for moving tape 11 to the next stripe. Tachometer 78A supplies pulses to counter adder 122 decrementing the inserted count toward a reference count whereat motor 78 is held in a stopped-lock position by servo 79.

The above described operations provide high noise rejection but do not necessarily accommodate perturbations in spacing between a succession of stripes. Because of such perturbations, inappropriate track offset signals may be inserted in register 97. To accommodate such perturbations (jitter), the error offset set of signals register 97 are analyzed by limiter decoder 125. If the offset of a given track is less than or equal to three, that value supplied over cable 126 to two sets of AND circuits, 127 and 128. In accordance with the signal on line 106, either set of AND's 127, 128 are activated to pass the limited offset signals to be either added or subtracted from the inserted step distance held in counter adder 122. The circle enablement symbol on AND's 127 represents that a negative signal on line 106; i.e., the sign is minus, pass the signals for adding same to the content of counter adder 122 whereas AND's 128 supply the incremental signals whenever the sign is positive or substraction from the signal content of counter adder 122. If the next successive stripe has a similar error, it will likewise be accommodated, whereas the average of such errors is being accumulated in OK116 for altering the average step size. It will be remembered that Ok116 is reset upon a sign change indicating a possible perturbation between center-to-center distances of adjacent stripes. Accordingly, FIG. 1 illustrated servo control provides not only for momentary immediate change of the step size for perturbation accommodation, but also provides average step size control with high noise rejection. Such noise rejection not only accommodates errors from the servo track, but also errors or perturbations in track spacing.

In the event of an error condition in the above described servo control, the step size in counter/adder 122 is frozen at the average step size contained in register and counter 85. Since the average is reasonably close to the actual track-to-track step size, successful transducing operations can continue. An error condition in a servo can be detected in many ways. One way is to measure elapsed time from the command signal on line 83 until the end of step signal appears on line 86A. Timer or time out circuit 130 times an interval greater than expected elapsed time for a track-to-track step. If the interval expires, DRC is notified and adder 122 is deactivated. DRC transfers contents of register and counter 85 to counter/adder 122 as above described.

While the invention has been particularly shown and described with reference to a preferred embodiment thereof, it will be understood by those skilled in the art that various changes in form and detail may be made therein without departing from the spirit and scope of the invention.

What is claimed is:

1. The method of operating a helical scan tape recorder of the incremental step type, including the steps of,
    moving the tape to a stripe a preset number of stripes ahead of a first stripe to be transduced,
    presetting a tachometer move control to a given number supposedly representative of a number of tach pulses between adjacent stripe center lines,
    stepping the tape a stripe at a time toward said first stripe said preset number of stripes,
    sensing stripe location data, and
    adjusting said given number in accordance with said stripe location data and which of said preset number of stripes said stripe location data represents.

2. The method set forth in claim 1 further including the steps of registering said stripe location data as offset errors, and
    counting the number of offset errors of like signs that occur in a row and adjusting said given number in accordance with the number of successive offset errors with like signs.

3. The method set forth in claim 1 further including the steps of,
    counting the number of preset stripes from which stripe location data has been obtained,
    adjusting said given number at a first frequency of stripes for subset of said preset numbers,
    adjusting said given number at a second frequency of stripes for the remainder of said preset number of stripes, and
    moving the tape from stripe to stripe for transducing operations and adjusting said given number only when a predetermined number of successive offsets have like signs wherein said predetermined number represents a frequency of change substantially less than the frequency of change in said preset number of stripes.

4. The method set forth in claim 1 further including,
    moving a head across stripe to be sensed at least twice and sensing the stripe location data only upon the last traversal of the head past the stripe whereby the tape has settled from being stepped to a new stripe location before such stripe location data is used for several control purposes.

5. A helical scan tape recorder having a rotating head for traversing a record tape along parallel disposed record stripes wherein the tape has a longitudinally extending servo track to be sensed by said rotating head, including means for detecting and indicating track offsets together with directions of offset, a position control servo for positioning the tape in incremental steps;
    the improvement including in combination:
    means detecting that a given offset is greater than a predetermined offset,
    means counting a successive number of such predetermined offsets that occur in a row in a given direction,
    average step size register means indicating the number of stripes traversed,
    step size control means jointly responsive to said number of stripes being traversed and said offset threshold indicator to alter the signal contents of said average step size register means, and
    means for selectively transferring signal contents of said average step size register means to said position control servo.

6. The apparatus set forth in claim 5 further including in combination:
    a step distance counter and adder interposed between said transferring means and said position servo means and responsive to tape transport to decrement to a given reference number, and
    jitter control means responsive to said offset register signal contents being a given number and to the sign of said offset to alter signal contents of said step distance counter adder on each receipt from said averager step size register means.

7. Apparatus set forth in claim 5 wherein said stripe counter has a preset modulus in having first and second output control signals respectively indicating that a first and second number of stripes have been stepped and the control output signal indicating that transducing operation should be occurring;
    said increment control means being responsive to said first and second output signals to alter the said signal content of said average step size register including first means responsive to the sign of said offset plus a number of successive offsets of a given sign in a row in said first number of stripes to alter said signal content by a first amount, and second means responsive to a number of successive offsets in a row of a given sign plus said second number of stripes to alter said signal content by a second amount less than said first amount.

8. Apparatus as set forth in claim 5 further including in combination:
    servo error detecting means responsive to an error condition to freeze the step size of the servo.

* * * * *